No. 845,621. PATENTED FEB. 26, 1907.
L. E. DORON.
NUT LOCK.
APPLICATION FILED NOV. 10, 1906.
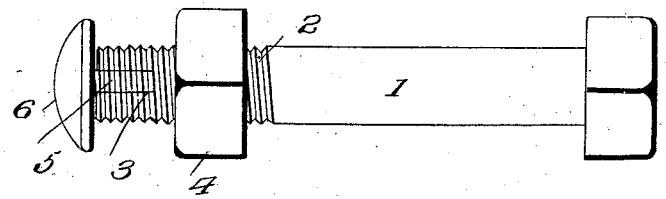
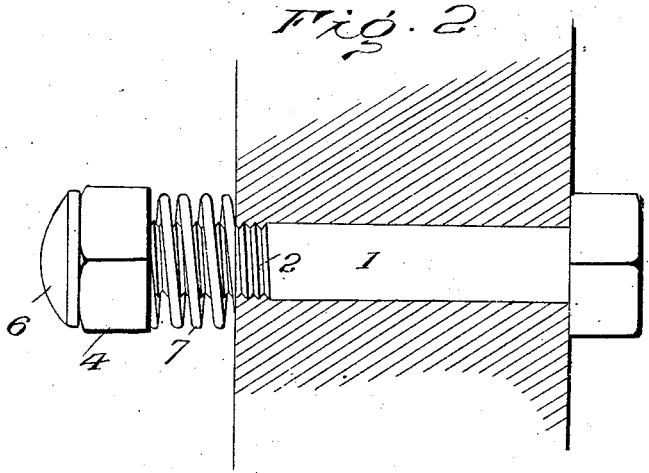
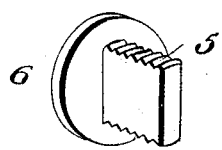
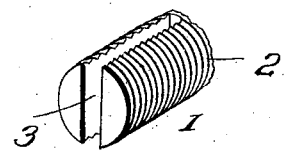
Witnesses
Inventor
L. E. Doron
Attorneys

UNITED STATES PATENT OFFICE.

LOUIS E. DORON, OF THAYER, KANSAS.

NUT-LOCK.

No. 845,621.     Specification of Letters Patent.     Patented Feb. 26, 1907.

Application filed November 10, 1906. Serial No. 342,877.

*To all whom it may concern:*

Be it known that I, LOUIS E. DORON, a citizen of the United States, residing at Thayer, in the county of Neosho and State of Kansas, have invented certain new and useful Improvements in Nut-Locks, of which the following is a specification.

This invention consists of a new and novel form of lock means for use in connection with nuts and bolts for preventing accidental displacement of a nut from the bolt when the parts are subjected to the vibration, jar, and similar conditions of service incident to the actual use of devices of this class.

For a full understanding of the invention and the merits thereof and also to acquire a knowledge of the details of construction and the means for effecting the result reference is to be had to the following description and accompanying drawings, in which—

Figure 1 is a side elevation of the invention, the parts not being shown in operative positions. Fig. 2 is a vertical longitudinal sectional view of the invention applied, the nut being locked from displacement. Fig. 3 is a detail perspective view of the key alone. Fig. 4 is a fragmentary view of the slotted end of the bolt.

Corresponding and like parts are referred to in the following description and indicated in all the views of the drawings by the same reference characters.

The bolt 1 shown is an ordinary form of bolt such as is usually employed on machinery, railroads, bridge constructions, or the like, the threaded end portion 2 of the bolt, however, being formed in its outer end with a longitudinal recess or slot 3, extending the entire transverse extent or diameter of the bolt. The nut 4 is of the usual form. A key 5, substantially equal in width to the diameter of the bolt, is adapted to be inserted in a slot 3 and is formed at its outer end with a head 6 of greater size than the diameter of the opening in the nut 4, so as to abut with the outer side of the nut when the key is in operative position and to prevent unscrewing movement thereof. The longitudinal edges of the key 5 are formed with thread-sections adapted to constitute continuations of the threaded portion of the bolt 1 when the key is inserted in the slot 3 and the device is in use.

The construction and use of the invention will appear fully in a description of the operation thereof. It is contemplated to use in connection with the nut 4 a resilient or flexible washer, or a plurality of spring-washers may be used, if desired. Before the key 5 is inserted in the slot 3 the nut 4 is screwed upon the threaded shank of the bolt until the outer side of the nut is coincident with or beyond the inner extremity of the slot 3. The key 5 is then inserted in the slot 3 with the thread-sections at the ends of the key registering with the threads of the bolt. The nut when screwed on the bolt, as above mentioned, will compress the spring-washers 7, and said nut may therefore be unscrewed a certain distance after the key 5 has been inserted until the nut has a screw connection with the thread-sections on the key 5 and abuts with the inner side of the head 6 of said key. The nut will then be locked from further unscrewing movement and of course cannot be accidentally displaced, at the same time performing its desired function with respect to screwing the work to which the bolt is applied.

The key, with its head 6, constitutes a lock member for the nut 4, and in turn the nut acts as a lock means, so to speak, to prevent the key from being displaced from its locking coöperation with respect to the nut. The construction is very simple, easy to operate, and is desirable for various reasons, which will be apparent from the foregoing.

Having thus described the invention, what is claimed as new is—

A nut-lock consisting of a bolt having the usual threaded portion, a nut screwed thereon, the threaded portion of the bolt being formed with a longitudinal slot terminating a distance from the inner termination of said threaded portion of the bolt, a key of a width equal to the diameter of and inserted in the slot aforesaid and having thread-sections at its opposite longitudinal edges adapted to be engaged by the nut upon reverse movement of the latter, said key being formed with a head at its outer end adapted to project laterally from the threaded end of the bolt to engage the outer side of the nut to prevent displacement of the latter.

In testimony whereof I affix my signature in presence of two witnesses.

LOUIS E. DORON. [L. S.]

Witnesses:
     V. H. COWDEN,
     W. A. WALTHALL.